United States Patent
Kinzenbaw et al.

(10) Patent No.: US 10,888,044 B2
(45) Date of Patent: Jan. 12, 2021

(54) PIVOTING IMPLEMENT FRAME

(71) Applicant: Kinze Manufacturing, Inc., Williamsburg, IA (US)

(72) Inventors: Jon E. Kinzenbaw, Williamsburg, IA (US); Robert Blackwell, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 115 days.

(21) Appl. No.: 15/916,759

(22) Filed: Mar. 9, 2018

(65) Prior Publication Data

US 2018/0255695 A1    Sep. 13, 2018

Related U.S. Application Data

(60) Provisional application No. 62/469,621, filed on Mar. 10, 2017.

(51) Int. Cl.

| *A01B 73/06* | (2006.01) |
|---|---|
| *A01B 73/00* | (2006.01) |
| *A01B 73/04* | (2006.01) |
| *A01B 63/24* | (2006.01) |
| *A01B 63/16* | (2006.01) |

(52) U.S. Cl.
CPC .......... *A01B 73/005* (2013.01); *A01B 73/042* (2013.01); *A01B 73/065* (2013.01); *A01B 63/16* (2013.01); *A01B 63/24* (2013.01)

(58) Field of Classification Search
CPC .. A01B 15/14; A01B 3/00; A01B 3/24; A01B 5/04; A01B 59/00; A01B 59/042; A01B 73/00; A01B 73/005; A01B 73/06; A01B 73/065; A01B 63/22; A01C 7/08; A01C 7/208

See application file for complete search history.

(56) References Cited

U.S. PATENT DOCUMENTS

| 6,068,064 A | 5/2000 | Bettin et al. |
|---|---|---|
| 6,082,467 A | 7/2000 | Friesen |

(Continued)

FOREIGN PATENT DOCUMENTS

WO    2017059259 A1    4/2017

OTHER PUBLICATIONS

"The International Search Report and Written Opinion of the International Searching Authority", in connection to PCT/US18/21687 dated May 29, 2018.

*Primary Examiner* — Tara Mayo-Pinnock
(74) *Attorney, Agent, or Firm* — McKee, Voorhees & Sease, PLC

(57) ABSTRACT

A lift and rotate style agricultural implement with forward folding wings is provided. The agricultural implement includes a center frame that may be operatively configured to be lifted and rotated approximately 90 degrees when switching between a field configuration and a transport configuration. Furthermore, the wings may include an inner portion and an outer portion, wherein the outer portion may be operatively configured to be rotated or pivoted approximately 180 degrees relative to the inner wing portion when switching between a field configuration and a transport configuration. The inner and outer wing portions may be connected by a hinge and the outer wing may be pivoted about the inner wing portion by a cylinder.

21 Claims, 14 Drawing Sheets

(56) References Cited

U.S. PATENT DOCUMENTS 8,127,861 B2 3/2012 Meek
2011/0315411 A1* 12/2011 Adams et al. ......... A01B 73/02
172/311
2016/0302350 A1 10/2016 Kinzenbaw et al.

* cited by examiner

PIVOTING IMPLEMENT FRAME

CROSS-REFERENCE TO RELATED APPLICATIONS

This application claims priority under 35 U.S.C. § 119 to Provisional Application U.S. Ser. No. 62/469,621, filed on Mar. 10, 2017, the contents of which are hereby incorporated by reference in their entirety and for all purposes.

FIELD OF THE INVENTION

The invention relates generally to an agricultural implement. More specifically, but not exclusively, the invention relates to an agricultural implement including a frame that lifts and rotates to convert between a field-use configuration and a transport configuration.

BACKGROUND OF THE INVENTION

As the power of tractors and agricultural efficiency has increased, agricultural implements, such as planters have increased in span, or width, to accommodate larger numbers of individual row units. Large planters generally include a main frame having a forward hitch assembly for drawing by a tractor and left and right wing sections pivotally attached to a portion of the main frame. To allow for transport of these larger planters from field to field, typically a planter may be configured to have the main frame and wings be lifted and rotated to orient the frame and wings in a generally parallel orientation relative to the hitch assembly. This typically requires the incorporation of telescoping hitch assemblies and specific lifting and rotating functions to accommodate a planter of increased width. An improvement in planter design is represented by the system disclosed in U.S. Pat. No. 4,506,904. This system permits the planter bar to be transported end-wise rather than by folding. U.S. Pat. Nos. 4,721,168 and 5,346,019 disclose other improvements in large implement transport and storage which employs a cylindrical vertical pivot post for rotating a lift frame in combination with four bar linkage for raising and lowering the lift frame on a carrier frame. Due to the length limitations on the length of the tongue of the hitch assembly and/or the length of a planter that may be transported safely down a public road or highway, the width of the planter was limited. For example, a 40-foot-wide planter, once lifted and rotated to be in parallel with the hitch may be 50 feet long measuring from the hitch to the back of the planter. An implement of this length can be difficult to transport on public highways due to the required turning radius.

Alternatively, folding style planters may fold wings in a vertical direction relative to the main frame or fold approximately 90 degrees forward in a scissor-like action placing the wings in parallel with another for transport and storage of the planter. The wings are displaced vertically or in a generally forward direction in order to reduce the width of the planter to provide clearance for transport through narrower spaces. However, in either case, the length of the wings may be limited. For example, a vertically folded wing must fit under power lines, bridges, and/or traffic lights. The wings of forward folding planters may be limited by the length of the telescoping tongue. The folding functions of such planters have, to varying degrees, operating limitations due to their design and the environment in which they operate.

Therefore, there exists a need in the art for an apparatus that allows increased length of lift and rotate style agricultural planters that overcome the deficiencies in the art.

BRIEF SUMMARY OF THE INVENTION

Therefore, it is a primary object, feature, and/or advantage of the invention to improve on and/or overcome the deficiencies in the art.

It is another object, feature, and/or advantage of the invention to provide an agricultural implement with a tongue extending from a center tool bar, wherein one or more ground engaging tools may be mounted to the center toolbar. The agricultural implement may further comprise one or more wings extending from opposing sides of the center toolbar, wherein each of the one or more wings may comprise an inner wing section and an outer wing section.

It is yet another object, feature, and/or advantage of the invention to provide an apparatus and system to assist with mounting ground engaging tools to the center toolbar and/or the wings of the agricultural implement. The ground engaging tools may include planter row units, diggers, plow shanks, discs, disc rippers, scrapers, blades, rotary tillers, cultivators, fertilizer applicator, or similar agricultural tools.

It is a further object, feature, and/or advantage of the invention to provide an apparatus and system to assist with spacing of the ground engaging tools mounted on the center toolbar and/or the wings of the agricultural implement.

It is still a further object, feature, and/or advantage of the invention to provide an apparatus for folding an outer section of the wing approximately 180 degrees relative to an inner section of the wing, about a substantially vertical axis.

It is still yet a further object, feature, and/or advantage of the invention to provide a lift and rotate style agricultural implement including forward folding outer wing sections that allow for an increased width of the agricultural implement. The outer section of the wing may be folded approximately 180 degrees relative to an inner section of the wing, about a substantially vertical axis, and the center toolbar and wings may be lifted and rotated approximately 90 degrees relative to the tongue or centerline of implement, about a substantially vertical axis.

These and/or other objects, features, and advantages of the invention will be apparent to those skilled in the art. The invention is not to be limited to or by these objects, features and advantages. No single embodiment need provide each and every object, feature, or advantage.

Accordingly, one aspect of the invention includes an agricultural implement known as an agricultural planter. The planter may be connected to a tow tractor and may be oriented in a transport configuration and a field use configuration. The planter includes, at least in part, a tongue for connection to a tow vehicle. The planter may also include a main or center toolbar attached to the tongue away from the tow vehicle, as well as one or more wings pivotally coupled to the main toolbar. The wings may include an inner wing section and an outer wing section, wherein the outer wing section may be configured to pivot about a generally vertical axis relative to the inner wing section. The inner wing section may also be pivotally connected to the center toolbar and configured to pivot about the inner wing section about a generally horizontal axis relative to the center toolbar. The outer wing may be pivotally connected to the inner wing section to allow for vertical movement of the outer wing section relative to the inner wing section during operation of the implement in the field use configuration.

Furthermore, the planter may also include a plurality of ground engaging tools, also known as row units, diggers, disc-rippers, plow shank, etc. The row units may be attached to the center toolbar and/or the wings. Additionally, the row units are typically positioned adjacent to one another and evenly spaced along the center toolbar and/or wings depending on the agricultural operation being performed.

However, the present invention further includes an apparatus and system for lifting and rotating the center toolbar, and by extension the wings. The frame may comprise a system and/or apparatus including a lift apparatus and a rotation mechanism. Wherein the frame comprises a support member and one or more transport wheels operatively attached to the support member and configured to support the implement. The system may also include a rotation mechanism or vertical pivot post in combination with a four-bar linkage configured to lift and rotate the toolbar and wing(s) relative to the frame. In addition, the four-bar linkage could be replaced with a simple pivot or a post lift for lifting and rotating the toolbar and wing(s). The toolbar may also include a rail system with predefined locations for attaching row units that provide specific gaps between adjacent row units. A user may quickly reconfigure the row units between different predefined gap spacing's based on the agricultural operation being performed.

Figure 1:
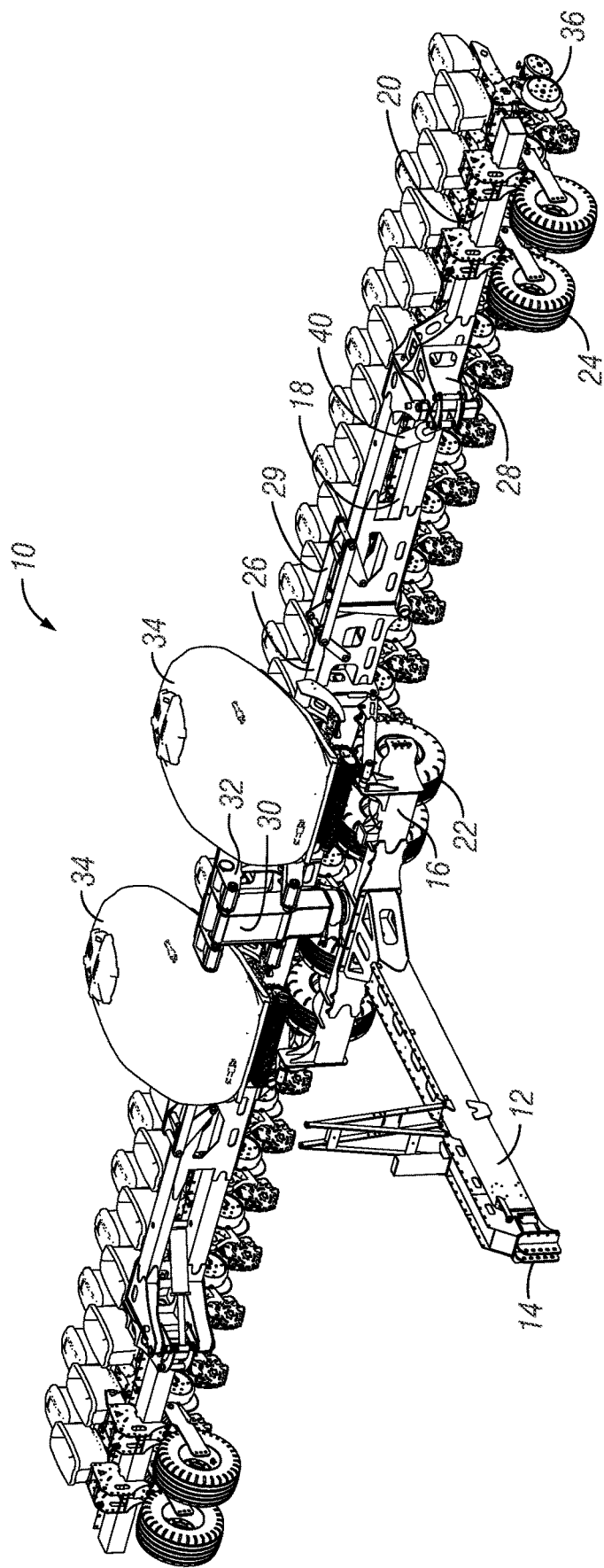
FIG. 1 is a perspective view of a lift and rotate agricultural implement with forward folding wings.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The invention is generally directed towards an agricultural implement, such as a planting implement, which may also be known as a planter. While the invention may be described in reference to a planter, it should be understood that the lift and rotate frame disclosed herein may be applied to other types of agricultural implements. The planter 10, as shown in FIG. 1, is of the type which may include a field use configuration, a turning configuration, and/or a transport configuration. For example, the planter 10 may include a tongue 12 member extending from a frame 16 toward a tow vehicle, such as a tractor. The frame 16 may support a toolbar 26 and be configured to lift and lower the toolbar 26. One or more wings may be attached to opposing sides of the toolbar by a hinge, pivot, pin, or similar joint mechanism. In a field use configuration, the wings may be oriented in a generally parallel configuration relative to the toolbar. In a transport configuration, the wings may be in a folded or angled relative to the toolbar. The toolbar and/or wings may include a plurality of row units 36 operatively attached to and spaced along the toolbar 26. For example, the row units may comprise planting apparatus, such as seed meters, for planting seed in a field. Alternatively, other types of attachments, such as discs, blades, shanks, fertilizers, sprayers, or other mechanisms associated with agriculture may be included.

In the field use configuration, the toolbar 26 and/or wings 18 and 20 may be oriented to be generally perpendicular or transverse to the tongue 12. The planter will be in a substantially similar orientation when the planter 10 is in a turning configuration, with the toolbar and/or wings generally transverse to the tongue. However, in the turning configuration, the toolbar 26 and/or wings 18 and 20 will be in a raised position relative to the frame 16 and the row units 36 will be at least partially lifted off the ground to allow for the planter 10 to be turned with reduced resistance. To transition the planter 10 to a transport configuration, the center toolbar 16 and row units 36 attached thereto can be lifted above the ground and to a height where the row units 36 and/or other components of the toolbar 16 are at least partially above the tongue 12. Next, a rotating mechanism 30 will rotate the toolbar 26 approximately 90 degrees to at least partially align the toolbar 26 with the tongue 12. Therefore, the agricultural implement or planter 10 may be referred to as a lift and rotate planter wherein the toolbar with row units are lifted and rotated to transition from a field-use configuration to a transport configuration. Alternatively, to transition back to the field-use configuration, the toolbar is rotated approximately 90 degrees in the opposite direction and then lowered after clearing the tongue 12 to allow the row units 36 attached to the toolbar 26 to engage the ground. For example, a planter 10 including a lifting assembly capable of lifting and rotating the toolbar is described in U.S. application Ser. No. 15/133,812, which is herein incorporated by reference in its entirety.

The rotation of the toolbar 26 to align it generally with the tongue 12 in a transport configuration will provide numerous advantages. For example, the transport configuration will provide the planter 10 with a much narrower profile for traveling along roads and to fit through narrower entrances or intersections. Furthermore, having the toolbar 26 positioned generally directly above the tongue 12 in the transport configuration will keep the height of the planter at a minimum, such that it can pass under most bridges and/or over-passes during transport. The transport configuration also provides easy access to the toolbar and/or ground engaging implements in a raised location for making modifications or repairs.

Furthermore, as will be understood, the planter 10 of the invention includes a frame 16 configured to support a combination of a central toolbar 26 and/or one or more wing sections 18 and 20 that allows for a substantially longer planter than is presently known for lift and rotate style planters. Increasing the overall length of the planter 10 allows for more row units 36 to be included along the toolbar 26 and/or wings 18 and 20 of the planter, which allows for fewer paths to be taken during planting of a field. In order to allow for the length of the toolbar to clear the tongue 12 and to be aligned thereto when in the transport configuration, a tongue 12 may be of the telescoping type. The tongue 12 includes components that can telescope inwards and outwards to extend or retract the length of the tongue 12 relative to a position of the tow vehicle, which will allow the length of the toolbar and/or wings to come to rest generally above said tongue, while not interfering with the tow vehicle. For example, the tongue may be extended to allow the planter 10 to transition to the transport configuration and the length of the tongue may be decreased when the planter is in the field-use configuration.

Figure 2:
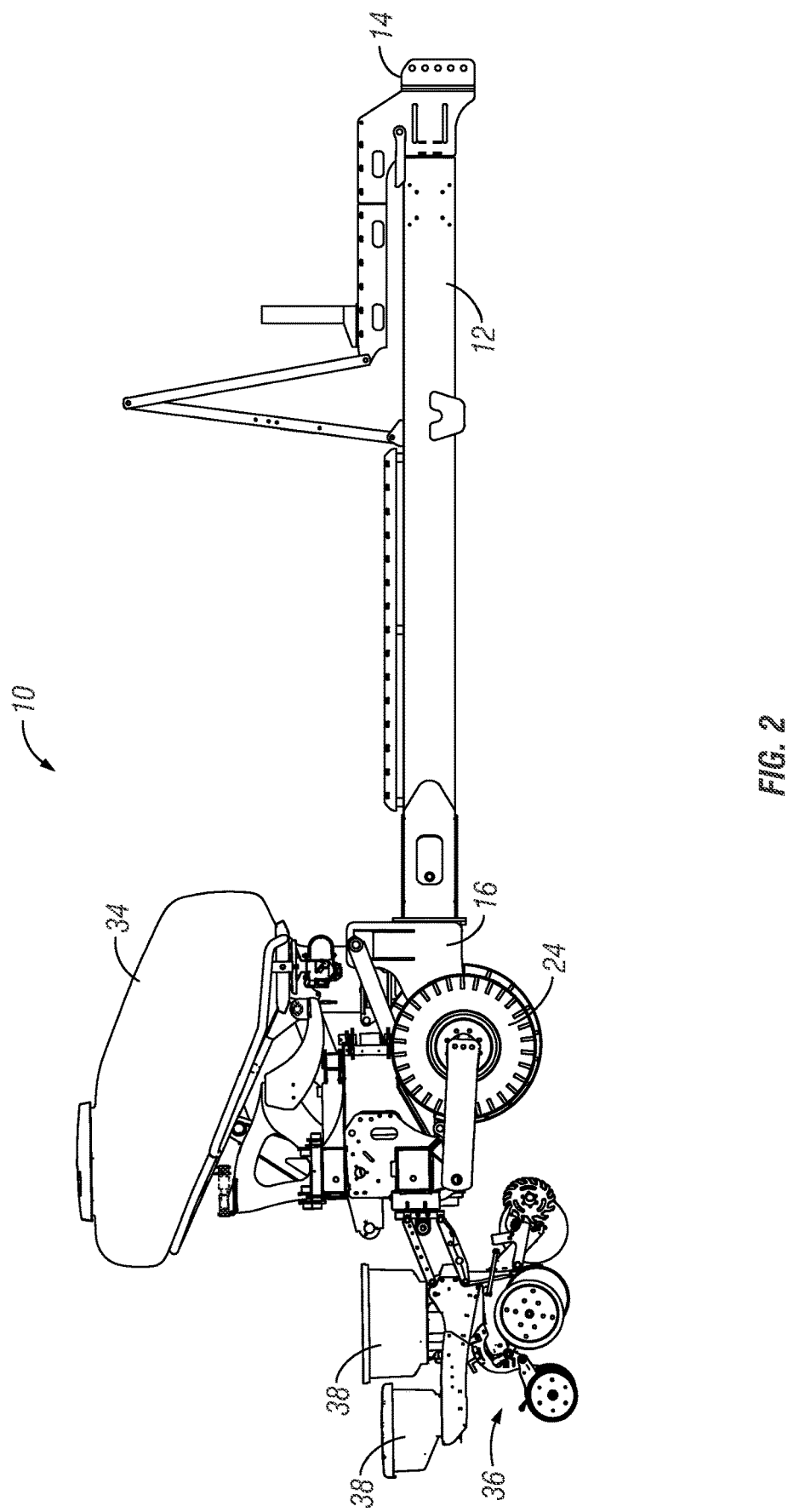
FIG. 2 is a side view of the lift and rotate agricultural implement with forward folding wings of FIG. 1.
Figure 3:
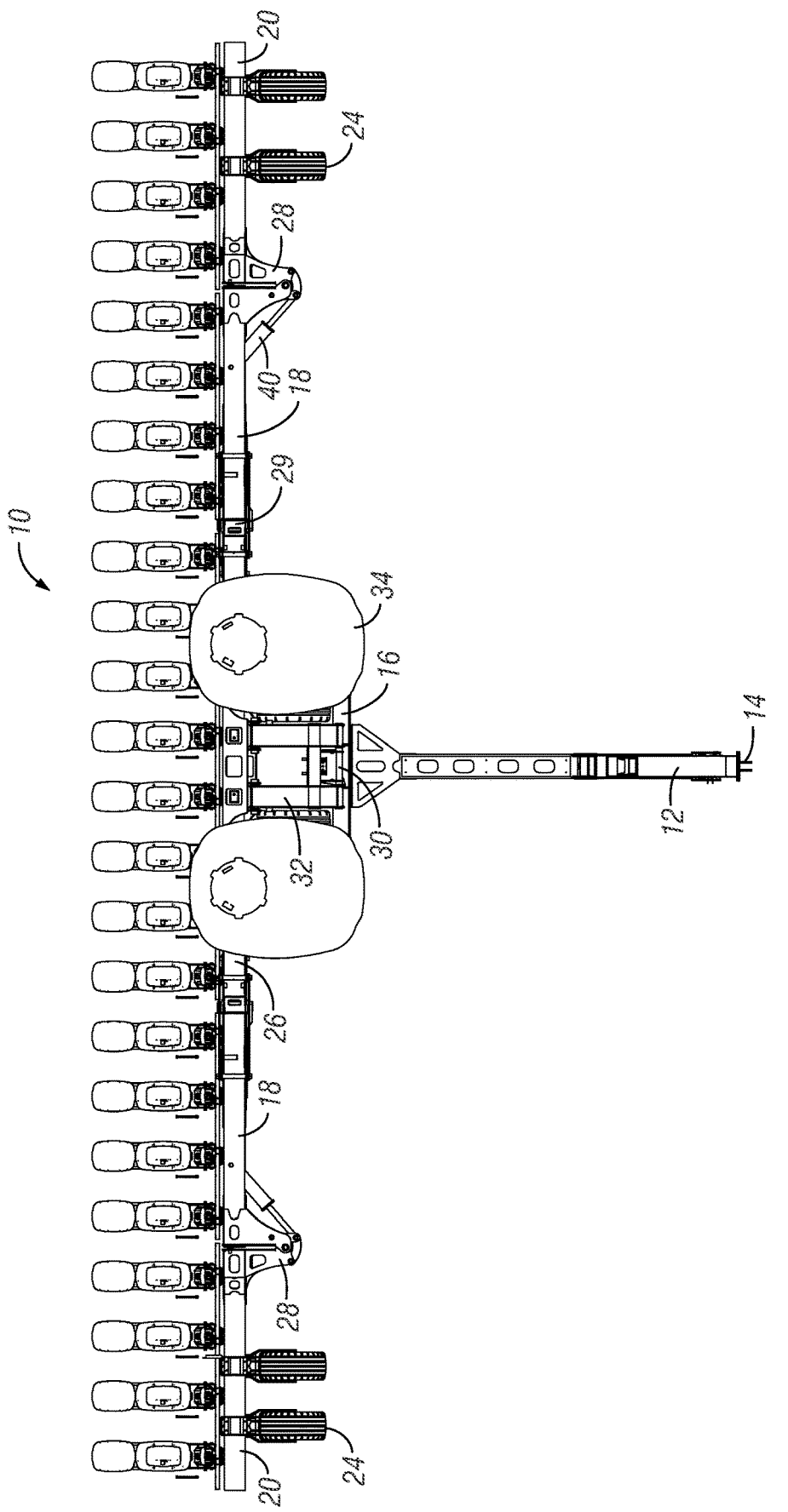
FIG. 3 is a top view of the lift and rotate agricultural implement with forward folding wings of FIG. 1.

Referring to FIGS. 1-3, an agricultural planter 10 with a frame configured to lift and rotate or pivot the toolbar 16 and/or wings 18 and 20 according to the aspects of the invention is shown. The frame section 16 is a rigid member and includes such components as transport wheels 22 connected thereto, as well as a toolbar lifting assembly 32 and a rotation mechanism or central pivoting post 30. The agricultural frame 16 may include a plurality of transport wheels 22 and be configured to support the toolbar 26. The transport wheels 22 may be configured to be in contact with the ground when the planter 10 is in the field-use configuration, turning configuration, and/or the transport configuration. For example, when in the field-use configuration, the transport wheels 22 may be in contact with the ground to maintain a pre-determined distance between the toolbar and the ground. The transport wheels 22 may also be configured to balance the toolbar and provide a desired amount of downforce on the row unit(s) 36 or other toolbar components. Furthermore, the transport wheels 22 may also be used to support the toolbar when the toolbar is in a raised position to allow the operator to turn the planter with less resistance. Alternatively, when the planter 10 is in the transport configuration, the transport wheels 22 may support the frame 16, which in turn supports the lifted and rotated toolbar 26 and/or wings 18 and 20. A hydraulic cylinder or similar type of actuator may be utilized to lift and lower the transport wheels.

The planter 10 as shown in FIGS. 1-3 is oriented in a field-use configuration. As shown in FIG. 1, the planter 10 may include a telescoping tongue 12 having a first end and an opposite second end. As mentioned, the tongue 12 may be telescoping to allow for the length of the tongue to be varied depending on the use or configuration of the planter 10. For example, when the planter 10 is in a field-use configuration (as shown in FIGS. 1-3), the length of the tongue 12 may be shortened to reduce the distance between the planter and the tow vehicle. Alternatively, the length of the tongue 12 may be increased when the planter 10 is oriented in a transport configuration (as shown in FIGS. 4-7) to allow for the toolbar and/or wings to be rotated to be parallel with the tongue 12. For example, a telescoping tongue 12 may include a hollow rectangular member disposed about a smaller rectangular member, the smaller rectangular member configured to slide within the larger hollow rectangular member to lengthen or shorten the tongue 12. It should also be appreciated that the telescoping tongue 12 may include additional members or sections as well, depending on the length needed. The additional tongue sections can be hollow and received within one another to allow the length of the tongue 12 to vary. While the planter 10 is shown and described as including a telescoping tongue, it should be understood that it is also contemplated that a telescoping tongue is not required. For example, a static or stationary tongue may be utilized if the length of the tongue, relative to the width of the planter 10, will provide sufficient clearance for the central toolbar 26 to be lifted and rotated without the toolbar and/or wing sections 18 and 20 contacting the tow vehicle. In determining the necessary length of the tongue, consideration must also be given to allowing for sufficient clearance between the tow vehicle and the toolbar and/or wing sections when making turns. A hitch 14 may be attached to the first end of the tongue 12. The hitch 18 may be any type of hitch for attaching the planter 10 to a tow vehicle, such as a tractor, truck, or other vehicle.

Opposite the hitch 14, the second end of the tongue 12 is attached to a frame section 16. The frame 16 is generally perpendicular to the tongue 12. The frame 16 may be supported by ground engaging transport wheels 22 that may include one or more hydraulic cylinders that may be used to raise and lower the frame 16. The center transport wheels 22 may be used to raise the frame when the planter 10 is required to make a turn, or the transport wheels 22 may also support the entire planter 10 when in a transport configuration. Operatively attached to the frame 16 is a center toolbar 26. The center toolbar may be one or more rigid members configured for attaching one or more row units 36. For example, the toolbar may include a polygonal shaped pipe or tube made of a steel or metal alloy. The toolbar may also include a steel alloy beam, such as an I-beam. The center toolbar 26 may be attached to the frame 16 by a lift assembly 32 mounted to a pivot post 30. The lift assembly 32 may include a four-bar linkage configured to lift the toolbar 26 relative to the frame 16. The four-bar linkage 32 comprises one or more upper linkage arms and one or more lower linkage arms. A first end of an upper linkage arm may be operatively attached to a central pivot post 30, and a second end of the upper linkage arm may be attached to the toolbar 26. If the upper linkage includes multiple linkage segments, the first end of each upper linkage arm may be positioned on opposite sides of central pivot post 30, as shown in FIG. 1. The lower linkage arms may include a similar configuration to the upper linkage arms. For example, the toolbar 26 may be connected to the frame 16 by the lift assembly 32 including a four-bar linkage and a cylinder or actuator configured to lift the toolbar 26. The four-bar linkage 32 may also include a rotation mechanism operatively attached to the center post 30 and configured to rotate or pivot the toolbar 26 relative to the frame 16. The four-bar linkage 32 and the rotation mechanism may be configured to operate in unison to lift the toolbar 26, including any wing sections 18 and 20, to a height where the row units 36 and/or any ground engaging tools will clear the frame 16 and tongue 12, and then rotate the toolbar 16 and wings 18 and 20 approximately 90 degrees, positioning at least a portion of the toolbar and/or wings generally above the tongue. The length and shape of the linkage arms of the lift assembly 32 can provide a desired path for the lifting and rotation of the toolbar 26.

It should also be understood that the four-bar linkage used to lift the toolbar is not to be limiting on the invention. For example, such a configuration could be replaced with a simple pivot and/or a post lift to lift and/or rotate the toolbar. The four-bar linkage is used for exemplary purposes.

The rotation mechanism and/or center post 30 may include a locking mechanism configured to secure the toolbar in the field-use configuration or the transport configuration. The post 30 may include one or more sets of holes or apertures that align when the toolbar is rotated to the field use or the transport configuration. For example, when the planter is in the field-use configuration, a pin may be inserted through the aligned holes of the rotation mechanism or post 30 that secures the toolbar in a generally transverse orientation relative to the tongue. Alternatively, a second set of holes may be configured to align when the toolbar is rotated to the transport configuration, and a pin may be inserted through the holes to secure the toolbar in place.

The planter 10 may also include one or more foldable wing sections 18 and 20 extending from either or both of the opposing ends of the toolbar 26. The wings may allow for an increased width of the planter when in the field-use configuration, without increasing the length of the planter in the transport configuration. As shown in FIGS. 1-3, inner wing sections 18 may be pivotally attached to opposing ends of the center toolbar 26 by an inner hinge 29. The hinge 29 may include a hydraulic cylinder or similar actuator that may be configured to pivot the wing(s) 18 about a generally horizontal axis. For example, the cylinder may be manually adjusted by the operator to rotate the inner wing section 18 upward or downward relative to the toolbar. The cylinder or actuator at the inner hinge 29 may be utilized to adjust and distribute the down pressure along the toolbar and/or wings. The cylinder may also include a float configuration to allow the inner wing section 18 to rotate relative to the toolbar 26 as dictated by the terrain or topography of the field. For example, the cylinder may be configured to expand and/or contract as mechanical forces are applied to the rod of the cylinder by the inner wing 18. Alternatively, the rod of the cylinder may be operatively attached to the inner wing 18 via a slotted hole, aperture, or track that allows the wing 18 to rotate freely as the end of the rod slides within the track. The hinge 29 may also include a four-bar linkage configured to guide and/or control the degree of rotation at the hinge 29. It should be understood that a wing 18 and 20 may include one or more pivot points or hinges 28 and 29 along the length of the wing 18 and 20, or no pivots at all. The number of hinges 28 and 29 included along a wing 18 and 20 typically will depend on the length of the wing 18 and 20, among other factors. For example, a longer wing 18 and 20 may require additional hinges 28 and 29 in order to allow for the appropriate flex in the wing to ensure all of the row units 36 attached to the wing remain in contact with the ground. Thus, in operation the inner wing section 18 may be elevated upward relative to the central toolbar 26, while an outer wing section 20 may be pivoted in a generally downward manner relative to the inner wing to make sure that the tools at the outer wing section 20 remain in contact with the ground. However, if a wing is shorter, no pivots may be required.

Furthermore, the inner hinge 29 may include a wing flex apparatus for mounting ground engaging tools, such as a row unit 36, proximate to the hinge or pivot point 28 and 29. For example, the wing flex apparatus may be configured to allow for the inner wing section(s) 18 of the planter 10 to pivot relative to the toolbar 26, while restricting, at least partially, the amount of angular pivoting of the row unit 36 attached thereto and/or thereat. The wing flex apparatus, according to some aspects of the invention, can limit the side pivoting/rotation of the row unit 36 by approximately half as much as the wing will undergo, which prevents adjacent row units from contacting each other. An example of said wing flex apparatus is shown in FIGS. 8-14 and described below.

Figure 6:
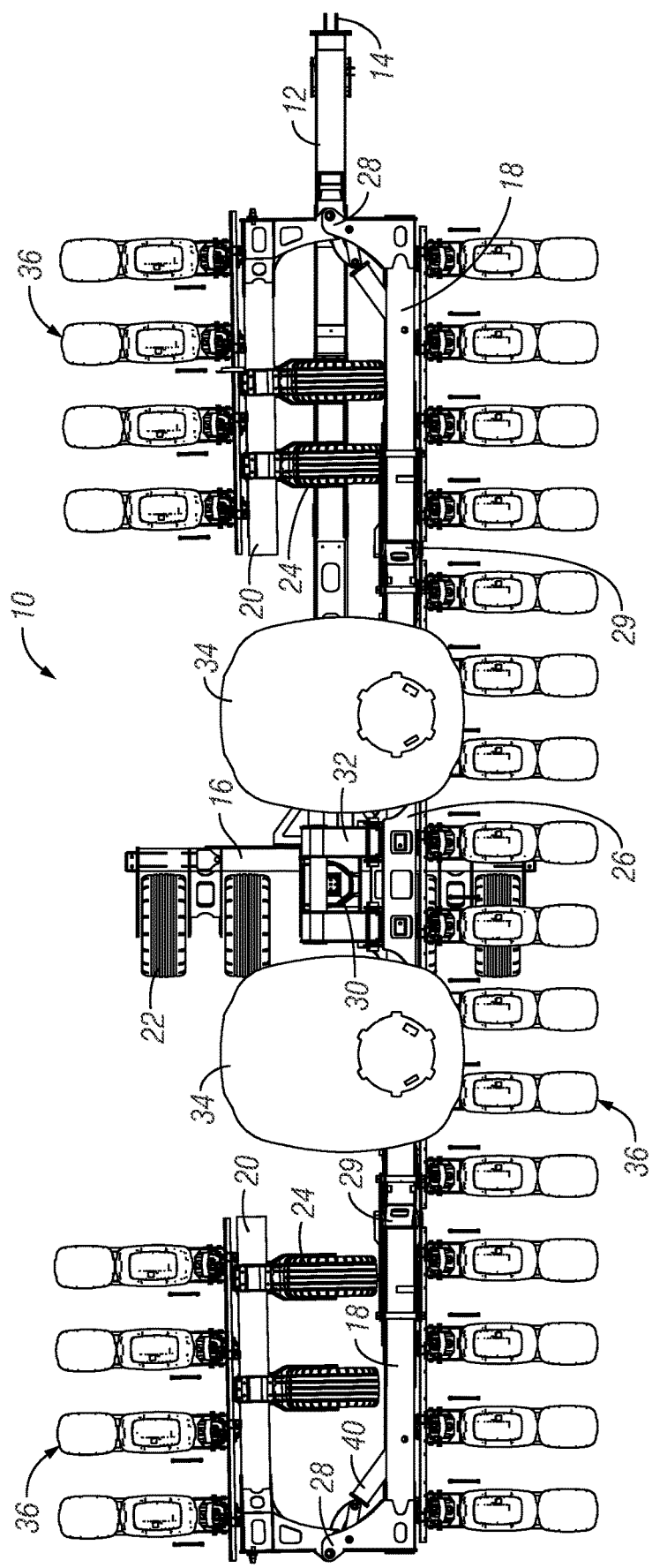
FIG. 6 is a top view of a lift and rotate agricultural implement with forward folding wings in transport mode of FIG. 4.
Figure 7:
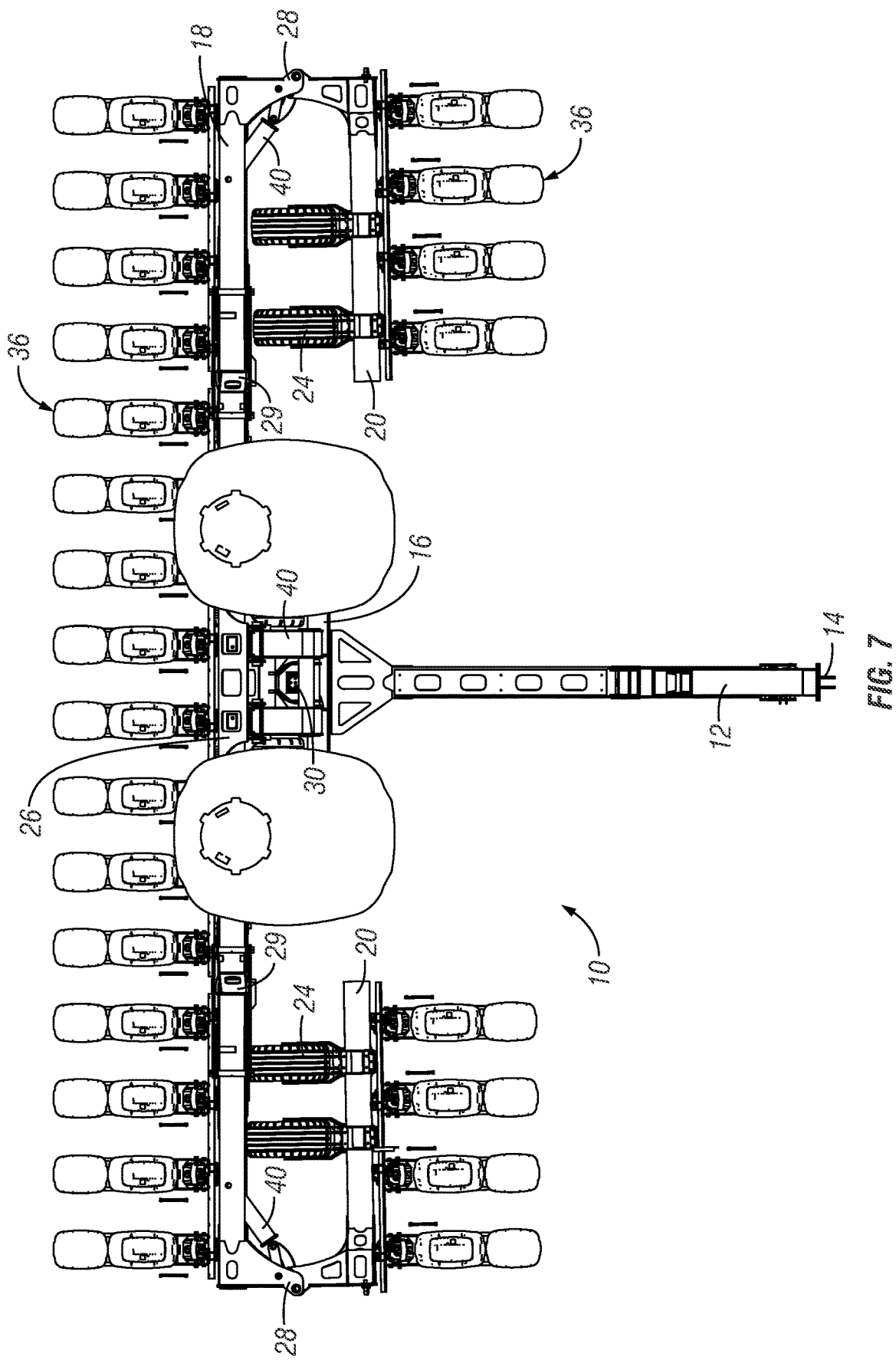
FIG. 7 is a top view of a lift and rotate agricultural implement with forward folding wings with outer wings folded.

The planter 10 may also include an outer wing section 20 pivotally attached to the inner wing section 18, opposite the toolbar. The outer wing section 20 may be attached to the inner wing section 18 by an outer hinge 28, pivot, pin, or similar joint mechanism, wherein the outer hinge 28 may be configured to pivot the outer wing 20 relative to the inner wing 18 about a generally vertical axis. The outer hinge 28 may be utilized to fold the outer wing 20 in generally forward direction to convert the planter 10 from a field use configuration (as shown in FIG. 3) to a transport configuration (as shown in FIGS. 6-7), and vice versa. The hinge 28 may also include a cylinder 40 or similar actuator. The cylinder 40 may include a housing and an extendable rod/ram. The housing may be connected to the inner wing 18 and the rod connected to the outer wing 20, or vice versa. The cylinder 40 may by hydraulic, pneumatic, or the like. The cylinder 40 may be operably connected to the vehicle towing the implement, and a user may be able to activate the cylinder from the vehicle. For example, the cylinder 40 may be connected to the hydraulic system of a tractor towing a planter, and the operator may activate the cylinder between the extended and retracted position using levers or controls in the cab of the tractor. It should also be understood that a stand-alone system on the planter 10 or implement may be utilized to actuate the cylinder 40 to fold the wing(s). The outer wing 20 may be pivoted or folded relative to the inner wing 18 by the cylinder 40 by extending and/or retracting the rod of the cylinder 40. For example, if the cylinder is positioned proximate the front of the hinge 28, the rod of the cylinder 40 may be in an extended position when the wing is in the field configuration. The rod of the cylinder 40 may be retracted to fold the outer wing 20 forward to the transport configuration. Alternatively, if the cylinder 40 is positioned proximate to the rear of the hinge 28, the rod of the cylinder 40 may be retracted to extend the wing to the field use configuration and the rod may be extended to fold the wing into the transport configuration.

The outer hinge 28 may also be configured to pivot the outer wing(s) 20 about a generally horizontal axis, as described above, to provide angular rotation of the outer wing(s) 20 relative to the inner wing 18 when traveling over an uneven surface in a field use configuration. It should be understood that an agricultural implement, such as a planter 10, may include one or more wing sections 18 and 20, but wings are not required. Each wing section 18 and 20 may include one or more wing wheels 24 for supporting and lifting or lowering the wing sections 18 and 20. For example, the wing wheels 24 may aid with depth control of the row unit 36 by setting the distance between the wing toolbar and the ground. The wing wheels 24 may also be used to raise the wing sections 18 and 20 when the planter 10 transitions to a turning configuration to make a turn.

The figures show a plurality of row units 36 mounted to the center toolbar 16 and the wing sections 18 and 20 of a planter 10. The row units 36 are attached in an adjacent manner to the rear of the toolbar 16 and wing sections 18 and 20, away from the hitch 14. The number of row units 36 mounted along the toolbar 16 and/or the wing sections 18 and 20 may be based on the length of the planter 10, as determined by the overall length of the toolbar 16 and wing sections 18 and 20. It may also depend on the type of seed being planted. For example, it is contemplated that a shorter length planter 10 will likely have fewer row units 36 than a longer planter 10. Additionally, the desired gap between adjacent row units 36 may determine the number of row units 36 attached to the toolbar 16 and/or wing sections 18 and 20. As disclosed, the gap between the row units 36 may be configured based on the type of seed being planted. For example, if the row units 36 are configured to plant corn seed, there may be a twenty (20") inch gap or even a thirty (30") inch gap between adjacent row units 36. An example of a row unit and/or seed meter for use with the present invention may be of the type(s) described in U.S. application Ser. Nos. 13/829,726, 14/478,222, 14/619,758, and/or 14/592,965 which are all hereby incorporated by reference in their entirety. This includes electrically driven seed meters, hydraulically driven seed meters, multi-hybrid type seed meters, and the like. However, any type of row unit 36 may be used with the invention. The agricultural implement is not limited to a planter with row units, but instead could be adapted for use with any agricultural implement having ground engaging tools such as seed drills, cultivators, fertilizer and pesticide applicators, and the like.

The row units 36 shown in the figures include one or more individual hoppers 38. The individual hoppers may hold one or more varieties, hybrids, or types of seed to be planted by the row units 36. Wherein each row unit 36 includes multiple individual hoppers, each individual hopper may be configured to hold the same or different varieties of seeds, hybrids, fertilizers or the like. For example, one of the individual hoppers 38 may include a seed to be planted by the row unit 36 and a second individual hopper may hold a fertilizer or herbicide to planted/applied by the row unit 36. Alternatively, the first individual hopper 38 may include one variety of seed, and the second individual hopper 38 may include a second variety of seed. Additionally, the figures show the inclusion of central hoppers 34 for holding one or more varieties, hybrids, types of seed, fertilizer, herbicide, or the like to be planted/applied by the row units 36. Furthermore, while not explicitly shown, the planter 10 may include the use of an air seed delivery system, which is shown and described in U.S. application Ser. No. 12/829,654, which is also hereby incorporated by reference in its entirety. Therefore, it is to be appreciated that any type of planting system, including hoppers, row units, seed meters, seed delivery systems, and the like may be included and used with the planter 10 according to aspects of the invention.

While the row units 36 in FIGS. 1-7 are attached directly to the toolbar 26 and/or wings 18 and 20, it is contemplated that a rail unit may be utilized with the present invention for setting and/or adjusting the spacing between adjacent row units 36. For example, the rail unit may include one or more horizontally oriented bars, plates, or combination that may be attached to the toolbar 26 and/or wings 18 and 20. The one or more horizontally oriented bars or plates may include holes, slots, grooves, or the like, configured for attaching one or more row units 36 along the rail system. The holes, slots, grooves, or the like, for attaching one or more row units 36 to the rail system are configured to allow the row units 36 to be attached at predefined locations providing a specific gap or spacing between adjacent row units 36. An example rail system for attaching ground engaging tools to an agricultural implement is described in U.S. Application No. 62/235,630, which is hereby incorporated by reference in its entirety.

Referring to FIGS. 1-3, a lift and rotate style planter 10 including forward folding wings is shown. FIGS. 1-3 include various views of the planter 10 described above in a field and/or turning configuration, wherein the toolbar 26 and wings 18 and 20 are generally transverse to the tongue.

Figure 4:
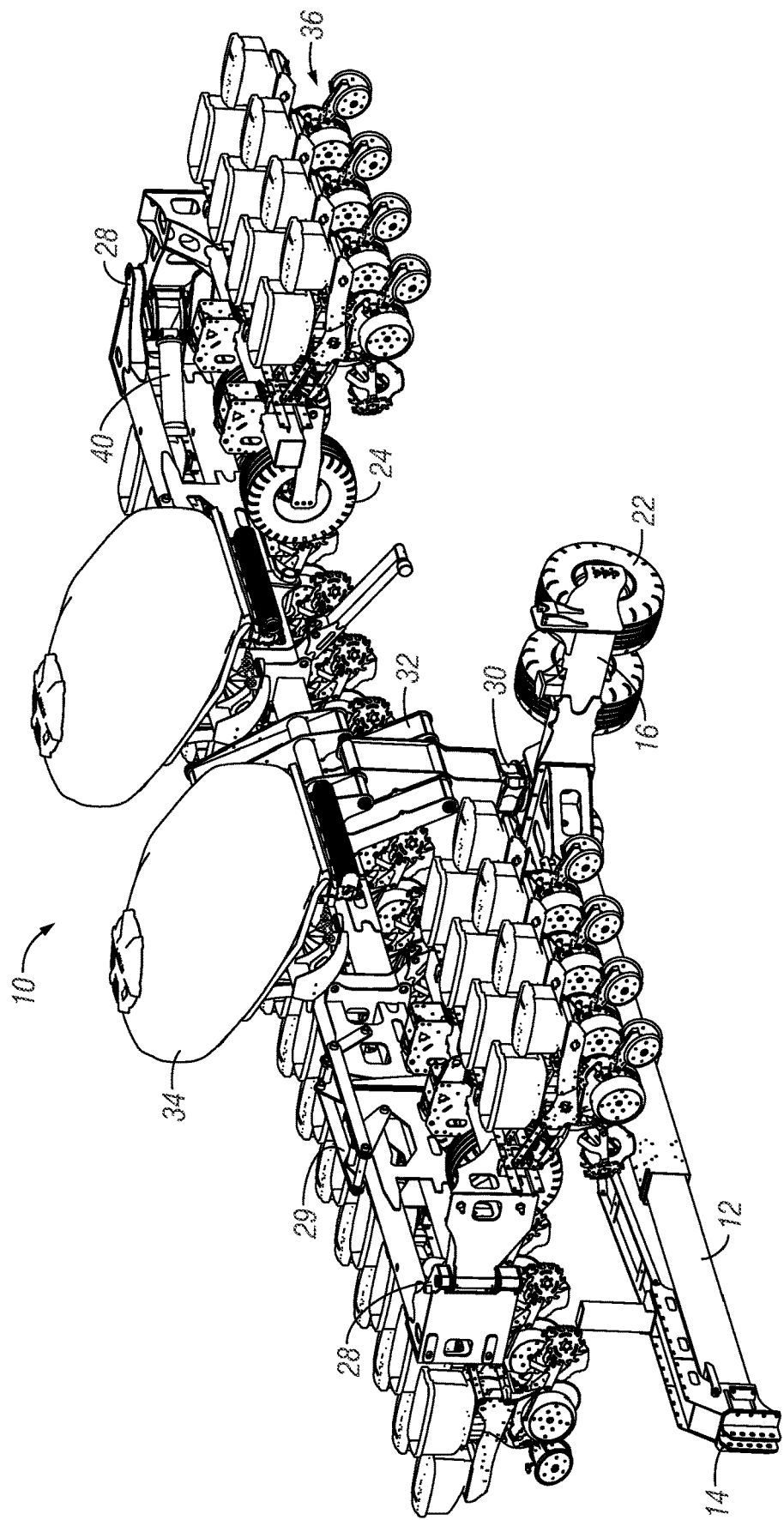
FIG. 4 is a perspective view of a lift and rotate agricultural implement with forward folding wings in transport mode.
Figure 5:
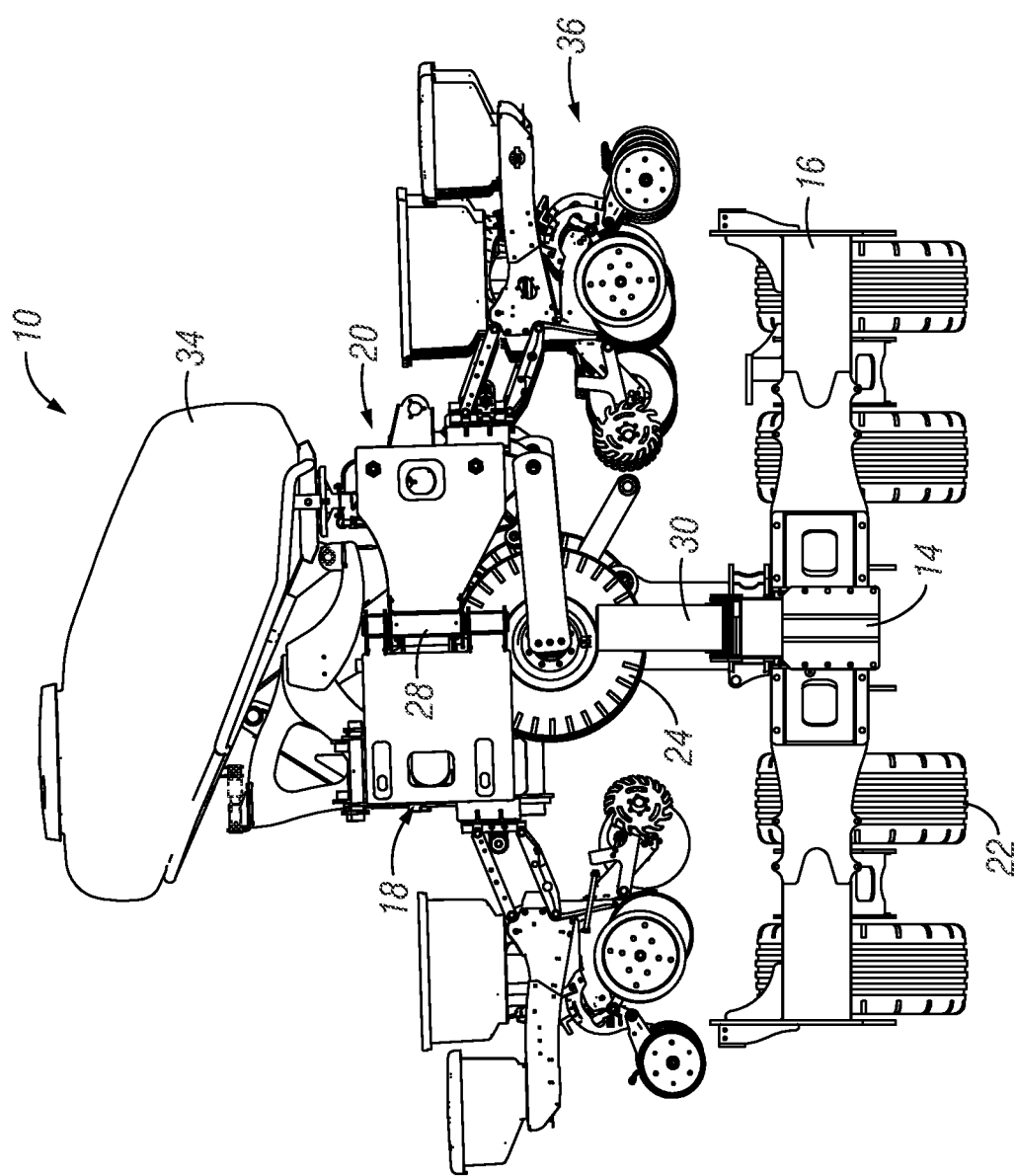
FIG. 5 is a front view of a lift and rotate agricultural implement with forward folding wings in transport mode of FIG. 4.

Referring to FIGS. 4-6, various views of the lift and rotate style planter 10 with forward folding wings in a transport configuration are shown. In the transport configuration, the outer wing section(s) 20 may be pivotally attached to the inner wing section by an outer hinge 28. The outer wing 20 may be folded inward by the outer hinge 28 approximately 180 degrees, relative to the inner wing section(s) 18. However, it is also contemplated that the outer wing may be rotated less than 180 degrees. The center toolbar 26 and wings may be lifted by the four-bar linkage 32 (or simple pivot and/or post lift) to a height wherein the ground engaging tools 36 are above the frame 16 and tongue 12. Once the toolbar has reached a height where the ground engaging tools will clear the frame 16 and tongue 12, the four-bar linkage may be rotated or pivot by a rotation mechanism to generally align the toolbar 26 in parallel with the tongue 12. Furthermore, the telescoping tongue may be in an extended position to allow for necessary clearance between the toolbar and/or wings when rotated to position the toolbar in a generally parallel orientation relative to the tongue 12. In transitioning the planter 10 from the field use configuration to the transport configuration, the cylinder(s) and/or the actuators of the lift assembly 32 may be activated and extended to extend the rod of the cylinder relative to the cylinder housing. The cylinders may be connected to the central pivot post 30 or the rotation mechanism and the linkage arms of the lift assembly 32 to allow the cylinders to be rotated with the toolbar 26 as the cylinder rod(s) is/are extended to lift the toolbar. Alternatively, the linkage arms of the lift assembly 32 may be operatively attached to the pivot post 30 by a splined shaft or gear system configured to lift and lower the linkage arms when the splined shaft or gears are rotated. For example, a splined shaft may pass through the central post 30 and be operatively attached to the linkage arm(s) of the lift assembly 32. The splined shaft may also be attached to an actuator, hydraulic motor, or the like that is configured to rotate the shaft. As the shaft is rotated in one direction, the linkage arm(s) may be rotated upward, resulting in the toolbar 26 being lifted relative to the frame. Alternatively, when the splined shaft is rotated in the opposite direction, the linkage arm(s) may lowered, lowering the toolbar.

Referring to FIG. 7, a lift and rotate style planter 10 with forward folding wings is shown in a transition phase between the field use configuration and the transport configuration. For example, prior to rotating the toolbar 26 to be generally aligned in parallel with the tongue 12, the outer wing sections 20 may be folded inward relative to the inner wing section 18 to reduce the overall length of the planter from end-to-end. While not shown in the figures, it is also contemplated that the outer wing 20 may be configured to fold or pivot in a generally rearward direction relative to the inner wing 18. To allow for the outer wing 20 to fold in a generally rearward direction, it is contemplated that the row unit or ground engaging tools 36 may be attached to the front of the toolbar 26 and/or wings 18 and 20.

While not shown in the figures, it is also contemplated that the toolbar and/or wings may be modified to include additional hinges and/or wing segments to allow for row units or ground engaging tools to be attached in front of and at the rear of the toolbar and/or wings. An agricultural implement including ground engaging tools in which there are both push row units and pull row units is shown and described in U.S. application Ser. No. 15/133,812, which again is herein incorporated by reference in its entirety. The inclusion of push and pull row units allows for a greater number of row units 36 to be attached to the toolbar 26 and wings 18 and 20 such that more seeds can be planted in a single path with the planter 10.

Additionally, the planter 10 may also include markers extending from ends of the outer wing(s) 20. The markers can be used to aid in determining where the edge or boundary of the planter is. For example, the markers may be configured to create a mark in the soil for the operator to align with when making a return pass in the field.

Figure 8:
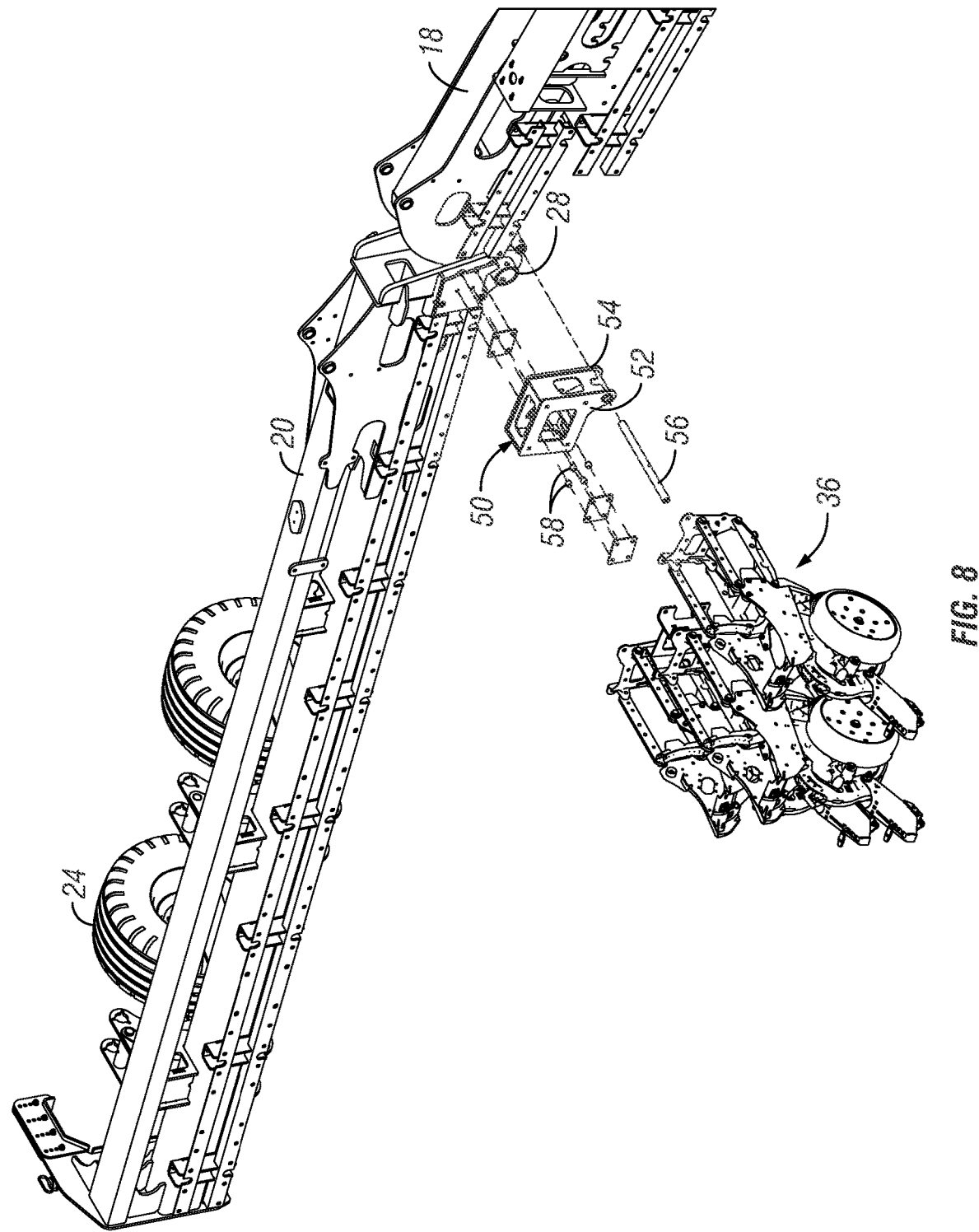
FIG. 8 is an exploded assembly view of a wing flex apparatus for attaching a row unit proximate to a pivot point.

Referring to FIG. 8, an exploded assembly drawing of a wing flex apparatus 50 for attaching a row unit 36 proximate to a pivot point (i.e., outer hinge 28) is shown. The wing includes an inner wing section 18 and an outer wing section 20 connected by a pivot point. The flex apparatus 50 may be pivotally connected to the inner wing section 18 by a pin 56. It is also contemplated that the wing flex apparatus 50 may be configured to be attached via the pin 56 to the outer section of the wing 20, such that apparatus 50 would mirror the one represented in FIG. 8 about the pivot point. Furthermore, it is contemplated that a wing flex apparatus 50 may be attached in front of the wing, behind the wing, or both in front of and behind the wing to allow for multiple ground engaging tools to be attached proximate to the pivot.

The pin 56 may be configured to allow the wing flex apparatus 50 to pivot about a generally horizontal axis when the outer wing section 20 rotates relative to the inner wing section 18. For example, as the wing travels over an uneven surface, the outer wing section 20 may rotate about the pivot point relative to the inner wing section 18. One of the many advantages provided by the pivot connection between the inner and outer wing sections 18, 20 is that it allows the outer wing section 20 to rotate relative to the inner wing section 18 in order to allow the attached row units 36 to maintain contact with the ground. The ability of the outer wing section 20 to rotate relative to the inner wing section 18 may also improve the depth control of the row units 36, with regard to the depth the seed is planted at, when the planter 10 travels over an uneven surface. For example, if the wing were a solid frame, when the planter travelled over an uneven surface, there would likely be less downward force on any row units 36 attached along the wing where there was a valley in the surface. It is even possible, that at times, one or more row units 36 attached at a point where the surface includes a valley, that the row unit 36 may lose contact with the ground entirely. The pivot along the wing allows for the outer section of the wing 20 to rotate about the inner section of the wing 18 to accommodate for changes in the terrain. While only one pivot is shown in FIG. 8, it should be understood that depending on the size and/or length of a wing, additional pivots may be required. It should be understood that a wing flex apparatus 50 may be utilized at each pivot along the wing for attaching a row unit 36 proximate to said pivot.

Figure 9:
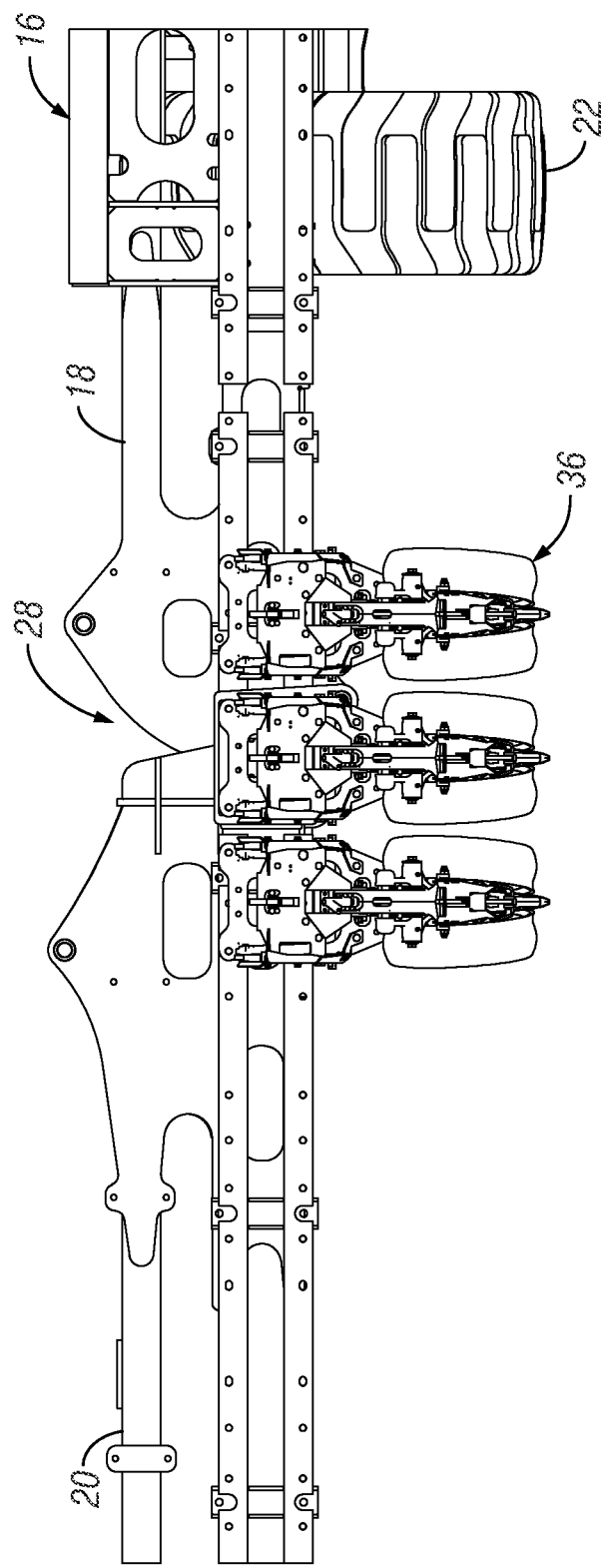
FIG. 9 is a rear view of a wing apparatus with a row unit attached with a wing oriented in a neutral flex position.

As shown in FIG. 8, the wing flex apparatus 50 includes a front plate 54 and a rear plate 52. The front plate 54 may include one or more tracks or slots 60 (as shown in FIG. 9). The tracks or slots 60 may include spacers or bushings 58 configured to travel within the tracks or slots 60. One or more pins, bolts, or the like, may operatively attach the wing flex apparatus 50 to the outer section of the wing 20. The pin, bolt, or the like, may be configured to pass through the spacers or bushings 58 and travel within the tracks or slots 60, which are configured to dampen the rotation of the wing flex apparatus 50. For example, as the outer wing section 20 rotates relative to the inner wing section 18, the pin 56 will allow the wing flex apparatus 50 to rotate and the size, shape, or curvature of the one or more tracks or slots 60 will determine the amount of rotation of the wing flex apparatus 50.

The rear plate 52 may include holes, slots, grooves, or the like, configured for attaching a row unit 36. The holes, slots, grooves, or the like, for attaching one or more row units 36 to the wing flex apparatus 50 may be configured to allow the row unit 36 to be attached to provide a specific gap 60 or spacing between adjacent row units 36. Furthermore, the holes, slots, grooves, and the like, may be configured such that the operator may convert the row units 36 from one predefined gap to another by attaching the row units 36 using a different hole configuration that are included in the rear plate 52. It should be understood that the pattern, location, and/or spacing of the holes, slots, grooves, or the like, may be configured based on the size and dimensions of a particular ground engaging tool or row unit 36. Furthermore, a wing flex apparatus 50 may be configured or adapted to attach a ground engaging tool or row unit 36 from various manufacturers. For example, one particular wing flex apparatus 50 may be configured for attaching row units 36 from manufacturer ABC, whereas another wing flex apparatus 50 may be for attaching row units 36 from manufacturer XYZ. It should also be understood that the configuration of holes, slots, or grooves for attaching one manufacturers row units 36 to provide a fifteen (15") inch gap may be different than the configuration for attaching a second manufacturers row units 36 to get the same thirty (30") inch gap between adjacent row units 36.

Referring to FIGS. 9-14, various example orientations of the wing flex apparatus 50 relative to the wing pivot position are shown. Shown in FIG. 9 is a rear view of wing oriented in a neutral flex position. A row unit 36 is operatively attached to the wing via the wing flex apparatus 50. FIG. 9 includes three row units 36, the middle row unit 36 being attached via the wing flex apparatus 50 proximate to the wing pivot, whereas the row units 36 to the left and right of the middle row units 36 will be attached to the outer 20 and inner 18 wing sections respectively.

Figure 10:
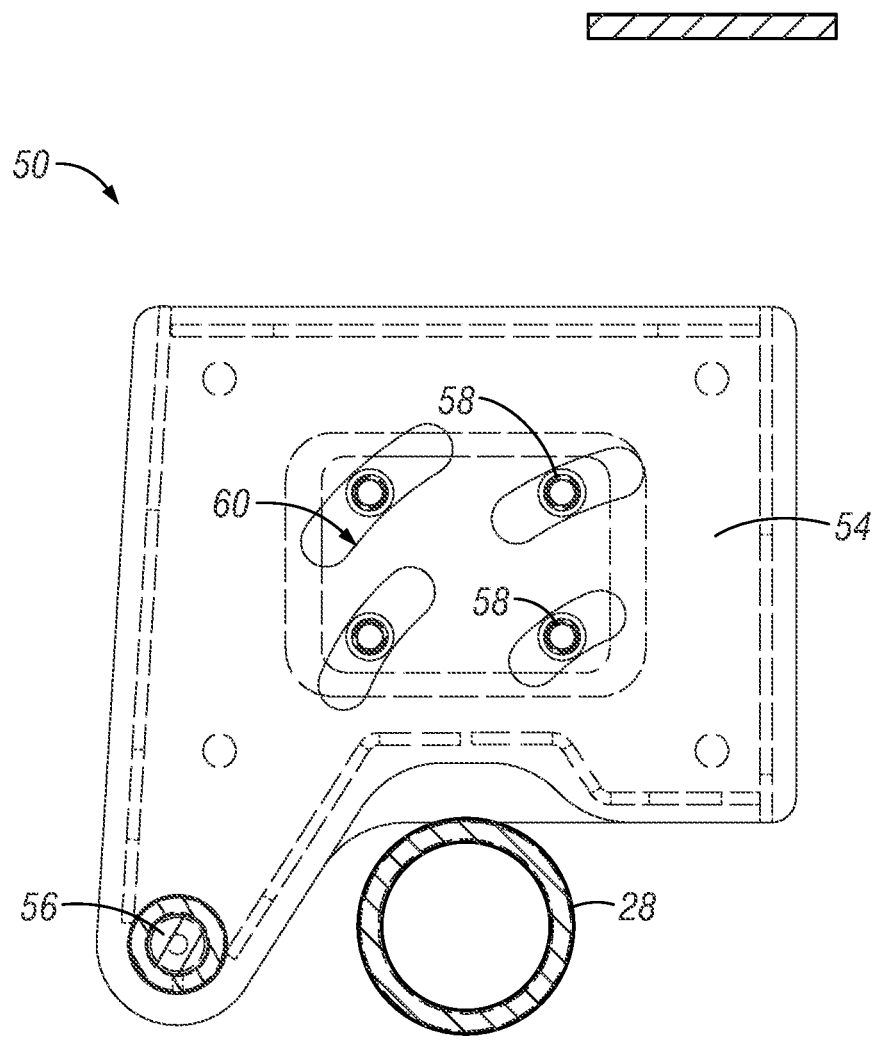
FIG. 10 is a front view of a wing flex apparatus with the wing in a neutral flex position.

Referring to FIG. 10, a front view of a wing flex apparatus with the wing in a neutral flex position is shown. The front plate 54 of the wing flex apparatus 50 may include one or more tracks or slots 60 configured to dampen the angular rotation of the apparatus. When the wing is in a neutral position, the bushings 58 that travel within the tracks or slots 60 will typically be near the center of each specific track or slot 60. Shown in FIG. 10 are four slots 60, but it should be understood that any number of tracks or slots 60 may be included. Additionally, the configuration and or orientation for the slots 60 may be configured to provide varying amounts of angular rotation of the wing flex apparatus 50 relative to the deflection of the wing pivot. For example, the slots 60 may be configured to provide one degree of rotation of the wing flex apparatus for every two degrees of flex of the wing pivot. The suggested 2:1 ratio of flex at the wing pivot to angular rotation of the wing flex apparatus 50 may provide an increase in the maximum flex allowable at the wing pivot. Attaching a row unit 36 proximate to the wing pivot without the wing flex apparatus 50 would likely result in limiting the amount of flex at the pivot. For example, if a row unit 36 were attached on each side of the wing pivot utilizing a fifteen (15") inch gap between the row units 36, the wing pivot may be limited to only six or seven degrees of flex before the row unit 36 attached to the outer wing section 20 would come into contact with the row unit 36 attached to the inner wing section 18. Alternatively, by using the wing flex apparatus 50 to dampen the angular rotation of a row unit 36 attached proximate to the pivot, using a slot configuration to provide a 2:1 ratio, the wing pivot may flex thirteen to fourteen degrees before the adjacent row units 36 attached proximate to the pivot would come into contact with one another. Additionally an increased amount of flex at the wing pivot may reduce compaction of the soil by more evenly distributing the weight along the wing when traveling over an uneven surface. It should be understood that the tracks or slots 60 may be configured to create any ratio of flex at the wing pivot to the angular rotation of the wing flex apparatus 50 that a user may desire.

Figure 11:
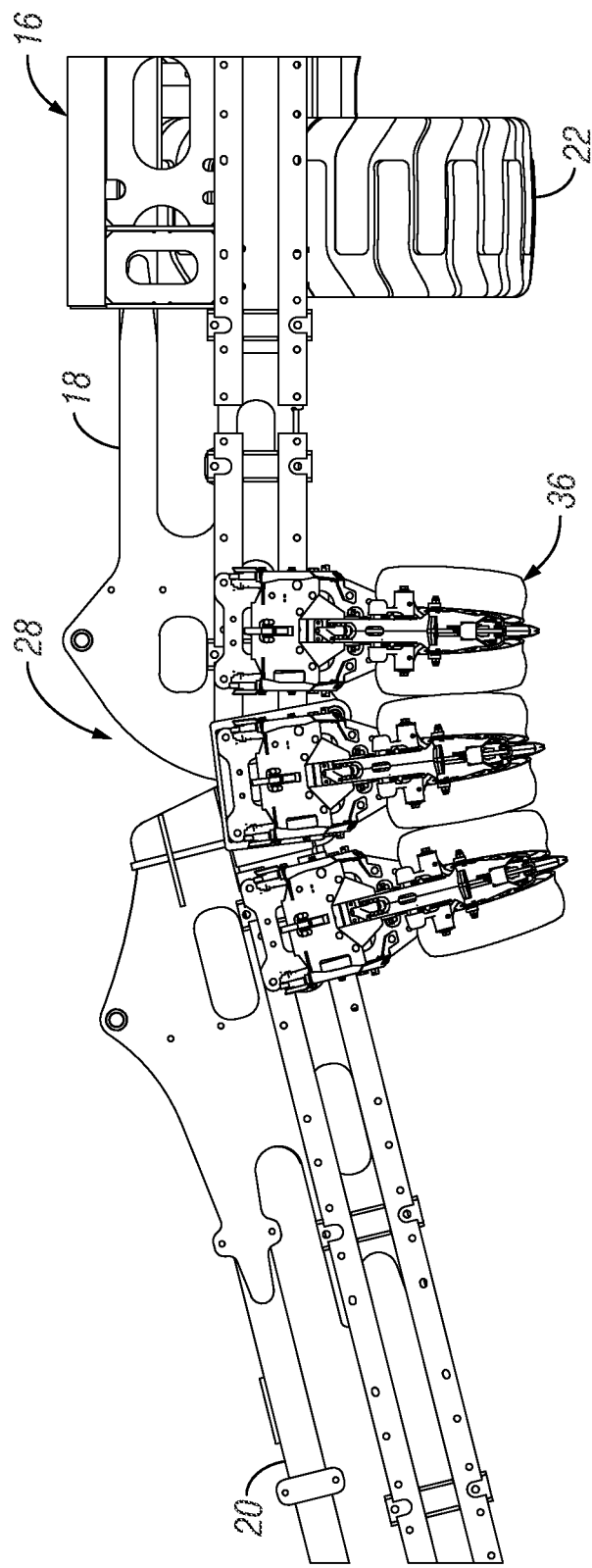
FIG. 11 is a rear view of a wing flex apparatus with a row unit attached with a wing oriented in a downward flex position.

Referring to FIG. 11, a rear view of a wing flex apparatus 50 with a row unit 36 attached is shown. FIG. 11 represents a wing oriented in a downward flex position with the middle row unit 36 attached to the wing flex apparatus 50. For example, this is likely to occur when the outer wing section 20 is travelling over a surface that is lower than the inner wing section 18. To accommodate for the uneven surface of the terrain, the wing pivot will flex, allowing the outer wing section 20 to rotate in a generally downward direction relative to the inner wing section 18.

Figure 12:
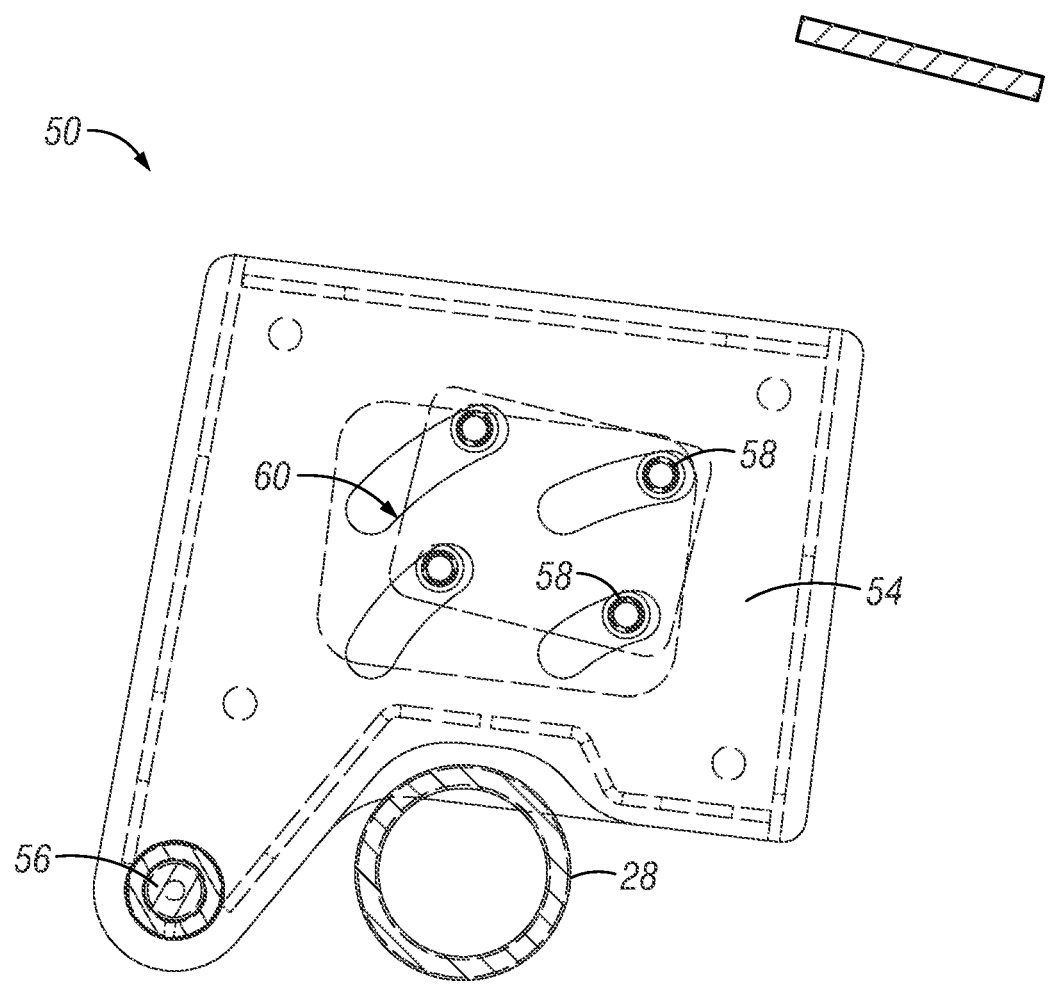
FIG. 12 is a front view of a wing flex apparatus with the wing in a downward flex position.

Referring to FIG. 12, a front view of a wing flex apparatus with the wing in a downward flex position is shown. When the wing is in a downward position, the bushings 58 will travel within the tracks or slots 60 as the wing flex apparatus rotates about the pin 56. As shown in FIG. 12, when the wing is in a downward position, the bushings 58 will travel from the center (neutral position) toward the right, as viewed from the front of the wing flex apparatus 50. It should be understood that the tracks or slots 60 may be configured to allow for the bushings to travel in either direction as the wing flex apparatus 50 rotates.

Figure 13:
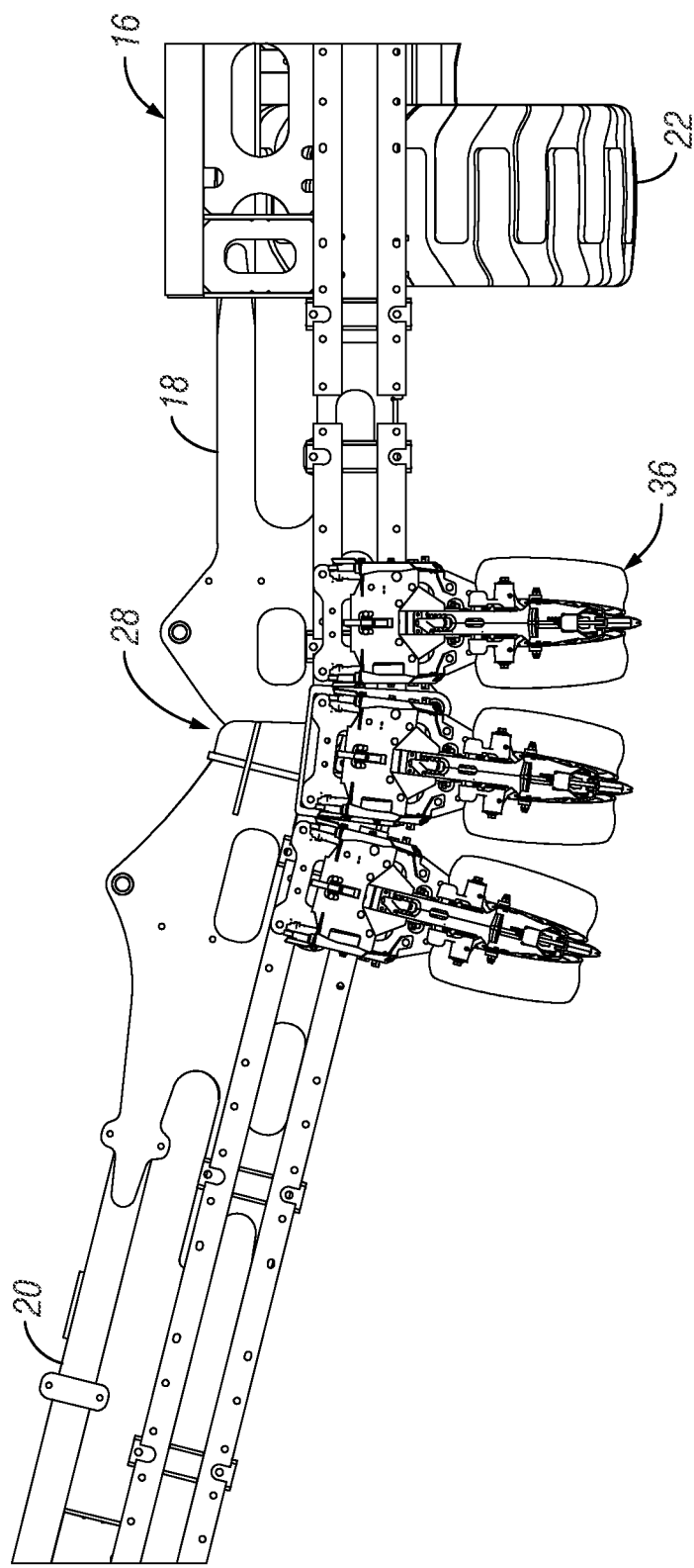
FIG. 13 is a rear view of a wing flex apparatus with a row unit attached with a wing oriented in an upward flex position.

Referring to FIG. 13, a rear view of a wing flex apparatus 50 with a row unit 36 attached is shown. FIG. 13 represents a wing oriented in an upward flex position with the middle row unit 36 attached to the wing flex apparatus 50. For example, this is likely to occur when the outer wing section 20 is travelling over a surface that is higher than the inner wing section 18. To accommodate for the uneven surface of the terrain, the wing pivot will flex, allowing the outer wing section 20 to rotate in a generally upward direction relative to the inner wing section 18.

Figure 14:
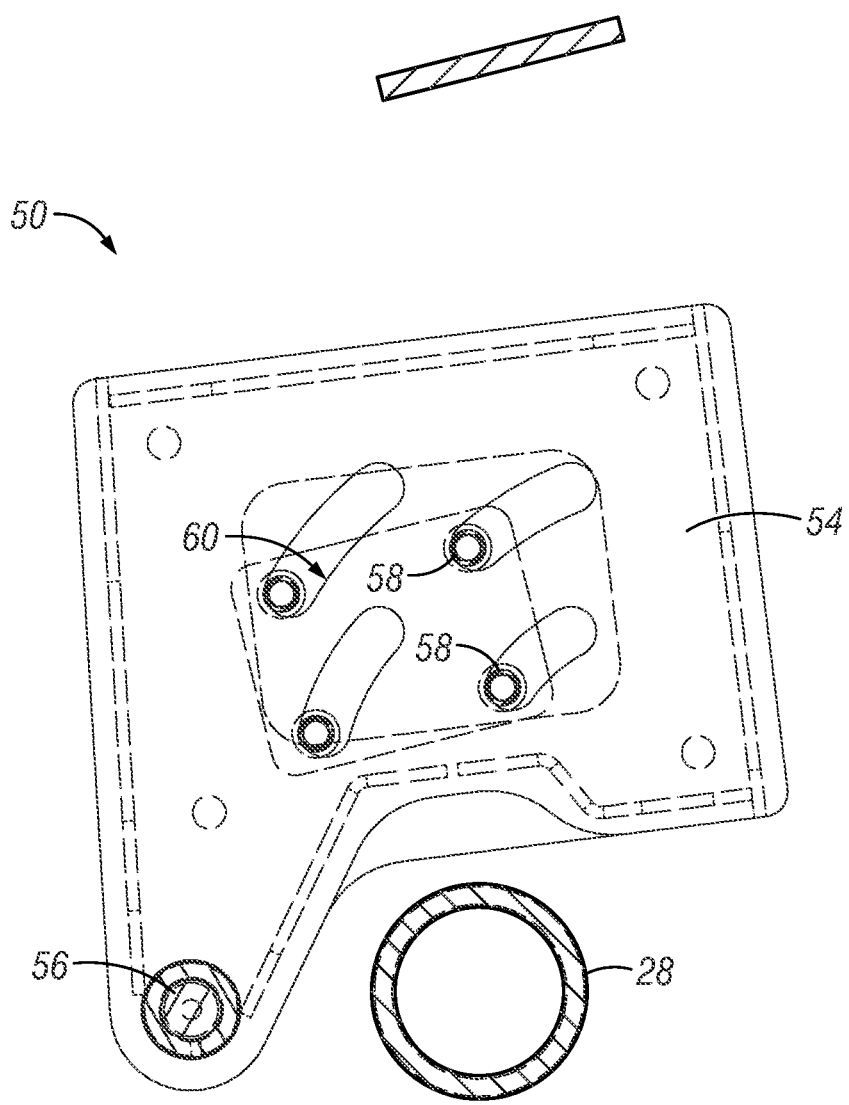
FIG. 14 is a front view of a wing flex apparatus with the wing in an upward flex position.

Referring to FIG. 14, a front view of a wing flex apparatus with the wing in an upward flex position is shown. When the wing is in an upward position, the bushings 58 will travel within the tracks or slots 60 as the wing flex apparatus 50 rotates about the pin 56. As shown in FIG. 14, when the wing is in an upward position, the bushings 58 will travel from the center (neutral position) toward the left, as viewed from the front of the wing flex apparatus 50.

While the figures primarily relate to the use of a wing flex apparatus 50 for attaching a row unit 36 proximate to the pivot point (i.e. outer hinge 28) of a planter 10, it should be understood that the wing flex apparatus 50 may be configured for use with other agricultural implements that include folding wings or pivot points. For example, the wing flex apparatus 50 may be configured for use with a plow to attach or mount the diggers, plow shanks, or tines where the wing pivotally attaches to the center toolbar. The wing flex apparatus 50 may also be configured for use with a field cultivator that includes folding wings and/or wing pivot points, whereas the wing flex apparatus 50 may attach a shank proximate to a pivot point.

A wing flex apparatus for attaching a ground engaging tool proximate to a hinge of a wing of an agricultural implement has thus been described. The wing flex apparatus is capable of limiting the angular rotation of an attached ground engaging tool relative to the angular rotation of an outer section of the wing pivoted about an inner section of the wing.

A lift and rotate style agricultural implement including an apparatus capable of folding an outer wing portion approximately 180 degrees has thus been described. The present invention contemplates numerous variations, options and alternatives, and is not to be limited to the specific embodiments described herein. Other changes are considered to be part of the present invention.

What is claimed is:

1. An agricultural implement comprising:
    a tongue comprising a first end and a second end;
    a center toolbar at the second end of the tongue;
    one or more wings pivotally coupled to the center toolbar, said one or more wings comprising an outer hinge, said outer hinge oriented to allow rotation about a substantially vertical axis and configured to pivot a segment of the one or more wings relative to the center toolbar about said substantially vertical axis; and
    a center pivot post operatively attached to the center toolbar, said center pivot post configured to lift the center toolbar and rotate the center toolbar about a generally vertical axis;
    wherein the agricultural implement includes a transport configuration wherein the segment has been pivoted towards the one or more wings and the center toolbar has been lifted and rotated such that the segment of the one or more wings, the center toolbar, the tongue, and a direction of travel are substantially parallel with one another.

2. The agricultural implement of claim 1, wherein the one or more wings further comprising an inner wing section and an outer wing section coupled by said outer hinge, said inner wing section configured to rotate about a substantially horizontal axis relative to the center toolbar during a planting configuration and said outer wing section configured to rotate about a substantially vertical axis relative to the inner wing section to move the implement towards the transport configuration.

3. The agricultural implement of claim 1, further comprising a plurality of ground engaging tools operatively attached to the center toolbar and the one or more wings.

4. The agricultural implement of claim 3, wherein the plurality of ground engaging tools operatively attached to the center toolbar comprise row units.

5. The agricultural implement of claim 3, further comprising a mounting assembly operatively attached to the one or more wings and the center toolbar, said mounting assembly comprising a plurality of attachment points configured to operatively attach the plurality of ground engaging tools along the one more wings and the center toolbar, said plurality of attachment points configured to provide a predefined spacing between adjacent ground engaging tools.

6. The agricultural implement of claim 1, wherein the agricultural implement includes a planting configuration and a transport configuration, wherein in said planting configuration the one or more wings generally perpendicular to said tongue, and in said transport configuration said one or more wings generally parallel to said tongue.

7. The agricultural implement of claim 6, wherein the center toolbar is rotated approximately 90 degrees relative to the tongue.

8. The agricultural implement of claim 6, wherein said center pivot post is configured to lift and rotate the center toolbar to switch between the planting configuration and the transport configuration.

9. The agricultural implement of claim 1, further comprising a pivot for coupling the one or more wings to the center toolbar, said pivot configured to rotate the one or more wings relative to the center toolbar about a generally horizontal axis.

10. The agricultural implement of claim 9, further comprising a wing flex apparatus operatively attached proximate to the pivot coupling the one or more wings to the center toolbar, said wing flex apparatus configured to attach one of the plurality of ground engaging tools proximate to the pivot.

11. The agricultural implement of claim 1, wherein the tongue is a telescoping tongue.

12. An agricultural implement comprising:
a tongue comprising a first end and a second end;
a center toolbar at the second end of the tongue;
one or more wings pivotally coupled to the center toolbar, said one or more wings comprising a hinge configured to pivot a segment of the one or more wings relative to the center toolbar about a substantially vertical axis;
a center pivot post operatively attached to the center toolbar, said center pivot post configured to lift the center toolbar and rotate the center toolbar about a generally vertical axis; and
a wing flex apparatus operatively attached proximate to the pivot coupling the one or more wings to the center toolbar, said wing flex apparatus configured to attach one of the plurality of ground engaging tools proximate to the pivot;
wherein the wing flex apparatus comprises one or more slotted tracks configured to limit the angular rotation of the ground engaging tool operatively engaged by the flex apparatus, said angular rotation of the ground engaging tool operatively engaged by the flex apparatus is less than the angular rotation of an adjacent ground engaging tool attached to the one or more wings.

13. A pivoting frame comprising:
a center toolbar;
one or more wings pivotally coupled to the center toolbar by an inner hinge configured to pivot the one or more wings relative to the center toolbar about a substantially horizontal axis when in a planting configuration;
wherein said one or more wings comprises an inner section and an outer section coupled by an outer hinge, said outer hinge oriented to allow rotation about a substantially vertical axis and configured to pivot the outer section relative to the inner section about said substantially vertical axis when moving towards and from a transport configuration; and
a center pivot post operatively attached to the center toolbar, said center post configured to lift and rotate the center toolbar;
wherein the agricultural implement includes a transport configuration wherein the outer section has been pivoted relative to the inner section and the center toolbar has been lifted and rotated such that the outer section of the one or more wings, the center toolbar, the tongue, and a direction of travel are substantially parallel with one another.

14. An agricultural implement comprising:
a telescoping tongue comprising a first end and a second end, said first end comprising a hitch configured to be attached to a tow vehicle;
a center toolbar attached to the second end of the tongue;
one or more wings pivotally coupled to the center toolbar by an inner hinge, said inner hinge oriented to allow rotation about a substantially vertical axis and configured to pivot the one or more wings relative to the center toolbar about a substantially horizontal axis when in a planting configuration;
wherein said one or more wings comprises an inner section and an outer section coupled by an outer hinge configured to pivot the outer section relative to the inner section about a substantially vertical axis when moving towards and from a transport configuration;
a plurality of ground engaging tools operatively attached along the center toolbar and the one or more wings, said plurality of ground engaging tools adjacent to one another; and
a center pivot post operatively attached to the center toolbar, said center post configured to lift and rotate the center toolbar;
wherein in the transport configuration, the outer section has been pivoted relative to the inner section and the center toolbar has been lifted and rotated such that the outer section of the one or more wings, the center toolbar, the tongue, and a direction of travel are substantially parallel with one another.

15. The agricultural implement of claim 14, further comprising an actuator pivotally connected at a first end at the outer hinge, and at a second end at the outer section of the one or more wings.

16. The agricultural implement of claim 15, wherein extension of the actuator extends the inner and outer sections of the one or wings towards a position wherein they are substantially in line, and wherein retraction of the actuator moves the inner and outer sections towards a position where they are facing one another.

17. A method of transporting an agricultural implement, the method comprising:
providing an agricultural implement frame comprising a tongue having a first end and a second end, wherein a center pivot post located proximate to the second end of the tongue is operatively attached to a center toolbar and one or more wings pivotally coupled to the center toolbar, said one or more wings and at least one ground engaging tool configured to pivot relative to the center toolbar about a generally vertical axis and the center pivot post is configured to lift the center toolbar and rotate the center toolbar about a generally vertical axis; and
transporting the agricultural implement while an outer section of the one or more wings, the center toolbar, the tongue, and a direction of travel are substantially parallel with one another.

18. The method of claim 17, further comprising pivoting the one or more wings about a generally vertical axis, said wings are pivoted approximately 180 degrees relative to the center toolbar.

19. The method of claim 17, further comprising lifting the center toolbar relative the tongue.

20. The method of claim 19, further comprising rotating the center toolbar about a generally vertical axis created by the center pivot post, said center toolbar rotated approximate 90 degrees relative to the tongue.

21. The method of claim 17 further comprising pivoting the outer section of the one or more wings forward, towards the direction of travel.

* * * * *